(12) United States Patent
Maes

(10) Patent No.: US 7,853,647 B2
(45) Date of Patent: Dec. 14, 2010

(54) NETWORK AGNOSTIC MEDIA SERVER CONTROL ENABLER

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 279 days.

(21) Appl. No.: 11/877,129

(22) Filed: Oct. 23, 2007

(65) Prior Publication Data

US 2008/0235354 A1    Sep. 25, 2008

Related U.S. Application Data

(60) Provisional application No. 60/896,676, filed on Mar. 23, 2007.

(51) Int. Cl.
*G06F 15/16* (2006.01)

(52) U.S. Cl. ................ 709/203; 709/217; 709/224; 709/231

(58) Field of Classification Search ............ 709/230, 709/231, 203, 217, 219, 223, 224
See application file for complete search history.

(56) References Cited

U.S. PATENT DOCUMENTS

| | | | |
|---|---|---|---|
| 5,850,517 A | 12/1998 | Verkler et al. | |
| 6,157,941 A | 12/2000 | Verkler et al. | |
| 6,230,271 B1 | 5/2001 | Wadlow et al. | |
| 6,336,138 B1 | 1/2002 | Caswell et al. | |
| 6,374,305 B1 | 4/2002 | Gupta et al. | |
| 6,578,159 B1 | 6/2003 | Kitagawa et al. | |
| 6,611,812 B2 | 8/2003 | Hurtado et al. | |
| 7,185,342 B1 | 2/2004 | Carrer et al. | |
| 6,748,570 B1 | 6/2004 | Bahrs et al. | |
| 6,792,605 B1 | 9/2004 | Roberts et al. | |
| 6,978,348 B2 * | 12/2005 | Belknap et al. | ............ 711/118 |
| 6,985,939 B2 | 1/2006 | Fletcher et al. | |
| 7,003,578 B2 | 2/2006 | Kanada et al. | |
| 7,042,988 B2 * | 5/2006 | Juitt et al. | ............ 379/88.17 |
| 7,111,060 B2 | 9/2006 | Araujo et al. | |
| 7,114,146 B2 | 9/2006 | Zhang et al. | |
| 7,114,148 B2 | 9/2006 | Irving et al. | |
| 7,143,094 B2 | 11/2006 | Arroyo et al. | |
| 7,146,616 B2 | 12/2006 | Dorner et al. | |
| 7,194,482 B2 | 3/2007 | Larkin et al. | |

(Continued)

OTHER PUBLICATIONS

U.S. Appl. No. 11/024,160, filed Dec. 2004, Maes.

(Continued)

*Primary Examiner*—Lashonda T Jacobs
(74) *Attorney, Agent, or Firm*—Townsend and Townsend and Crew, LLP

(57) ABSTRACT

Embodiments of the invention provide systems and methods for interacting with a media server on a network and/or protocol agnostic basis. According to one embodiment, a method for controlling a media server can comprise receiving a request to perform a media control function of the media server from an application via a northbound interface of a media server control enabler. The northbound interface can provide an abstract interface for invoking one or more of a plurality of media functions of the media server. The media control function of the media server can be requested via a southbound interface of the media server control enabler. The southbound interface can provide an interface specific to the media server.

25 Claims, 10 Drawing Sheets

U.S. PATENT DOCUMENTS

| | | | |
|---|---|---|---|
| 7,222,334 | B2 | 5/2007 | Casati et al. |
| 7,272,625 | B1 | 9/2007 | Hannel et al. |
| 7,340,508 | B1 | 3/2008 | Kasi et al. |
| 7,409,707 | B2 | 8/2008 | Swander et al. |
| 7,411,943 | B2 | 8/2008 | Kittredge et al. |
| 7,447,793 | B2 * | 11/2008 | Morioka ..................... 709/231 |
| 7,454,399 | B2 | 11/2008 | Matichuk |
| 7,461,062 | B2 | 12/2008 | Stewart et al. |
| 7,580,994 | B1 | 8/2009 | Fiszman et al. |
| 2002/0087674 | A1 | 7/2002 | Guilford et al. |
| 2002/0101879 | A1 | 8/2002 | Bouret |
| 2002/0111848 | A1 | 8/2002 | White |
| 2002/0143819 | A1 | 10/2002 | Han et al. |
| 2002/0178122 | A1 | 11/2002 | Maes |
| 2002/0184373 | A1 | 12/2002 | Maes |
| 2002/0194388 | A1 | 12/2002 | Boloker et al. |
| 2002/0198719 | A1 | 12/2002 | Gergic et al. |
| 2002/0198991 | A1 | 12/2002 | Gopalakrishnan et al. |
| 2003/0003953 | A1 | 1/2003 | Houplain |
| 2003/0023953 | A1 | 1/2003 | Lucassen et al. |
| 2003/0046316 | A1 | 3/2003 | Gergic et al. |
| 2003/0061268 | A1 | 3/2003 | Moerdijk et al. |
| 2003/0061404 | A1 | 3/2003 | Atwal et al. |
| 2003/0115203 | A1 | 6/2003 | Brown et al. |
| 2003/0115260 | A1 | 6/2003 | Edge |
| 2003/0131076 | A1 * | 7/2003 | Nelson et al. ............... 709/219 |
| 2003/0191769 | A1 | 10/2003 | Crisan et al. |
| 2003/0208539 | A1 | 11/2003 | Gildenblat et al. |
| 2003/0217044 | A1 | 11/2003 | Zhang et al. |
| 2003/0229812 | A1 | 12/2003 | Buchholz |
| 2004/0015547 | A1 | 1/2004 | Griffin et al. |
| 2004/0110493 | A1 | 6/2004 | Alvarez et al. |
| 2004/0128546 | A1 | 7/2004 | Blakley et al. |
| 2004/0139319 | A1 | 7/2004 | Favazza et al. |
| 2004/0176988 | A1 | 9/2004 | Boughannam |
| 2004/0221005 | A1 | 11/2004 | Albaugh et al. |
| 2005/0015340 | A1 | 1/2005 | Maes |
| 2005/0021670 | A1 | 1/2005 | Maes |
| 2005/0054287 | A1 | 3/2005 | Kim |
| 2005/0086197 | A1 | 4/2005 | Boubez et al. |
| 2005/0091156 | A1 | 4/2005 | Hailwood et al. |
| 2005/0125696 | A1 * | 6/2005 | Afshar et al. ............... 713/201 |
| 2005/0132086 | A1 | 6/2005 | Flurry et al. |
| 2005/0228984 | A1 | 10/2005 | Edery et al. |
| 2005/0249190 | A1 | 11/2005 | Birch |
| 2005/0249344 | A1 | 11/2005 | Mueller et al. |
| 2006/0014688 | A1 * | 1/2006 | Costa et al. .................... 514/12 |
| 2006/0041669 | A1 | 2/2006 | Bemmel et al. |
| 2006/0117109 | A1 | 6/2006 | Maes |
| 2006/0143686 | A1 | 6/2006 | Maes |
| 2006/0165060 | A1 | 7/2006 | Dua |
| 2006/0178898 | A1 | 8/2006 | Habibi |
| 2006/0190600 | A1 | 8/2006 | Blohm et al. |
| 2006/0212574 | A1 | 9/2006 | Maes |
| 2006/0256774 | A1 * | 11/2006 | Rigaldies et al. ............ 370/352 |
| 2006/0272028 | A1 | 11/2006 | Maes |
| 2006/0282856 | A1 | 12/2006 | Errico et al. |
| 2006/0291507 | A1 * | 12/2006 | Sarosi et al. ................. 370/493 |
| 2007/0011322 | A1 | 1/2007 | Moiso |
| 2007/0061397 | A1 | 3/2007 | Gregorat et al. |
| 2007/0100831 | A1 | 5/2007 | Cox |
| 2007/0100981 | A1 | 5/2007 | Adamczyk et al. |
| 2007/0118618 | A1 | 5/2007 | Kisel et al. |
| 2007/0150480 | A1 | 6/2007 | Hwang et al. |
| 2007/0150936 | A1 | 6/2007 | Maes |
| 2007/0203841 | A1 | 8/2007 | Maes |
| 2007/0204017 | A1 | 8/2007 | Maes |
| 2007/0233883 | A1 | 10/2007 | De Lutiis et al. |
| 2007/0239866 | A1 | 10/2007 | Cox et al. |
| 2007/0271554 | A1 | 11/2007 | Fletcher et al. |
| 2007/0276907 | A1 | 11/2007 | Maes |
| 2007/0280226 | A1 * | 12/2007 | Sonalkar et al. ............. 370/389 |
| 2007/0291859 | A1 | 12/2007 | Maes |
| 2008/0025243 | A1 | 1/2008 | Corneille et al. |
| 2008/0080479 | A1 | 4/2008 | Maes |
| 2008/0151918 | A1 | 6/2008 | Foti |
| 2008/0162637 | A1 | 7/2008 | Adamczyk et al. |
| 2008/0168523 | A1 * | 7/2008 | Ansari et al. ................. 725/131 |
| 2008/0186845 | A1 | 8/2008 | Maes |
| 2008/0189401 | A1 | 8/2008 | Maes |
| 2008/0228919 | A1 | 9/2008 | Doshi et al. |
| 2008/0232567 | A1 | 9/2008 | Maes |
| 2008/0235230 | A1 | 9/2008 | Maes |
| 2008/0235327 | A1 * | 9/2008 | Maes et al. .................. 709/203 |
| 2008/0235380 | A1 * | 9/2008 | Maes .......................... 709/227 |
| 2008/0288966 | A1 | 11/2008 | Maes |
| 2008/0301135 | A1 | 12/2008 | Alves et al. |
| 2008/0307108 | A1 * | 12/2008 | Yan et al. .................... 709/231 |
| 2009/0006360 | A1 | 1/2009 | Liao et al. |
| 2009/0015433 | A1 * | 1/2009 | James et al. ........... 340/825.69 |
| 2009/0034426 | A1 | 2/2009 | Luft et al. |
| 2009/0112875 | A1 | 4/2009 | Maes |
| 2009/0119303 | A1 * | 5/2009 | Rio et al. ....................... 707/10 |
| 2009/0125595 | A1 | 5/2009 | Maes |
| 2009/0132717 | A1 | 5/2009 | Maes |
| 2009/0187919 | A1 | 7/2009 | Maes |
| 2009/0193057 | A1 | 7/2009 | Maes |
| 2009/0193433 | A1 | 7/2009 | Maes |
| 2009/0201917 | A1 | 8/2009 | Maes et al. |
| 2009/0228584 | A1 | 9/2009 | Maes et al. |
| 2010/0049640 | A1 | 2/2010 | Maes |
| 2010/0049826 | A1 | 2/2010 | Maes |
| 2010/0058436 | A1 | 3/2010 | Maes |
| 2010/0077082 | A1 | 3/2010 | Hession et al. |

OTHER PUBLICATIONS

Andrews, Tony et al, Business Process Execution Language for Web Services, Version 1.1, BEA Systems, International Business Machines Corporation, SAP AG, Siebel Systems, May 5, 2003, 31 pages.

Liberty Architecture Overview, Liberty Alliance Project Version 1.1, Piscataway New Jersey, Jan. 15, 2003, 44 pages.

Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.

Maes, Stephanie, Multi-modal Web IBM Position W3C/WAP Workshop, IBM Research Human Language Technologies, downloaded http://www.w3.org on May 26, 2003, 9 pages.

Parlay APIs 4.0, Parlay X Web Services White Paper, The Parlay Group, Parlay X Working Group, Dec. 16, 2002, 12 pages.

Policy-Based Management Tom Sheldon's Linktionary, downloaded http://www.linktionary.com/policy.html on Aug. 2, 2004, 4 pages.

Seely, Scott, "XML and Web Services Security: Understanding WS-Security", Microsoft Corporation, 2002.

Simpson et al, Java Product Review—Oracle EDA Suite, Dec. 4, 2006, Open Source Magazine, pp. 1-10.

Single Sign on Deployment Guide, Introduction to Single-Sign-On, Netscape 6 Documentation Training Manual http://developer.netscape.com/docs/manuals/security/SSO/sso.htm on May 26, 2003, 5 Pages.

Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Thomas Manes, Anne, "Registering a Web Service in UDDI", 2003.

U.S. Appl. No. 11/848,347, filed Aug. 31, 2007, Final Office Action mailed May 10, 2010, 15 pages.

U.S. Appl. No. 11/848,347, filed Aug. 31, 2007, Office Action mailed Oct. 29, 2009, 12 pages.

U.S. Appl. No. 11/926,738, filed Oct. 29, 2007, Final Office Action mailed Jun. 29, 2010, 12 pages.

U.S. Appl. No. 11/926,738, filed Oct. 29, 2007, Office Action mailed Feb. 24, 2010, 12 pages.
U.S. Appl. No. 11/943,101, filed Nov. 20, 2007, Advisory Action mailed Apr. 16, 2010, 3 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 9 pages.
U.S. Appl. No. 11/951,500, filed Dec. 6, 2007, Advisory Action mailed Jun. 24, 2010, 2 pages.
U.S. Appl. No. 11/951,500, filed Dec. 6, 2007, Final Office Action mailed Mar. 30, 2010, 26 pages.
U.S. Appl. No. 11/951,500, filed Dec. 6, 2007, Office Action mailed Sep. 22, 2009, 24 pages.
U.S. Appl. No. 12/019,299, filed Jan. 24, 2008, Office Action mailed Mar. 31, 2010, 13 pages.
U.S. Appl. No. 10/855,999, filed May 28, 2004, Office Action dated Jun. 24, 2010, 20 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.

* cited by examiner

NETWORK AGNOSTIC MEDIA SERVER CONTROL ENABLER

CROSS-REFERENCES TO RELATED APPLICATIONS

This application claims the benefit of U.S. Provisional Application No. 60/896,676, filed Mar. 23, 2007 by Maes and entitled "Call Control Driven MVC Programming Model for Mixing Web and Call or Multimedia Applications," of which the entire disclosure is incorporated herein by reference.

BACKGROUND OF THE INVENTION

Embodiments of the present invention relate generally to methods and systems for interacting with a media server and more particularly to a network and/or protocol agnostic media server control enabler.

Generally speaking, a media server can be defined as a computer or other device that can perform any of a variety of functions on different types of media such as audio, video, or other media. The media may be stored on or by the media server or another computer or device in communication with the media server. Functions performed by a media server can include, for example, storing media, streaming media, mixing media, converting media, controlling the playback of media, e.g., providing VCR-like functions such as fast forward, reverse, pause, etc., controlling access to or participation in the media stream, and/or other media control functions, capturing statistics of the streaming and adjusting streaming, etc. In the most general sense, a media server can be considered to be any resource that provides any such media control functions.

Today, a wide variety of different manufacturers and vendors provide media servers. Consequently, there exists a wide variety of different ways to interact with and/or control media servers of different types. Some media servers can be controlled through strictly proprietary interfaces and/or communication protocols. In other cases, a media server may utilize a standardized interface or protocol for interacting with and/or communicating the media. These standard protocols and/or interface include Netann, Media Session Markup Language (MSML), Media Session Control Markup Language (MSCML), Mass Storage and Control Protocol (MSCP), Media Objects Markup Language (MOML), Media Gateway Control Protocol (MGCP), and others. However, there is no one standard for interfacing or interacting with media servers of different types. That is, while one type of media server can utilize one standardized protocol or interface, other media servers utilize a completely different set of standards. Therefore, building applications that are able to interact with media servers of different types is difficult and can require extensive programming for accommodating the different interfaces and protocols used. Hence, there is a need in the art for improved methods and systems for interacting with a media server on a network and/or protocol agnostic basis.

BRIEF SUMMARY OF THE INVENTION

Embodiments of the invention provide systems and methods for interacting with a media server on a network and/or protocol agnostic basis. According to one embodiment, a method for controlling a media server can comprise receiving a request to perform a media control function of the media server from an application via a northbound interface of a media server control enabler. The northbound interface can provide an abstract interface for invoking one or more of a plurality of media functions of the media server. The media control function of the media server can be requested via a southbound interface of the media server control enabler. The southbound interface can provide an interface specific to the media server. In some cases, the method can further comprise receiving results of the media function from the media server via the southbound interface of the media server control enabler and returning the results of the media function to the application via the northbound interface of the media server control enabler.

For example, the northbound interface of the media server control enabler can comprise an Application Program Interface (API). The media functions of the media server that can be invoked or accessed through the northbound interface can include, but are not limited to, a media streaming function, a media recording function, a media conversion function, a media mixing function, etc. The southbound interface of the media server control enabler can comprise one or more of a Session Initiation Protocol (SIP) interface, a Next Generation Networking (NGN) interface, a Public Switched Telephone Network (PSTN) interface, an Internet interface, a Parlay interface, a Netann interface, a Media Session Markup Language (MSML) interface, a Media Session Control Markup Language (MSCML) interface, a Mass Storage and Control Protocol (MSCP) interface, a Media Objects Markup Language (MOML) interface, a Media Gateway Control Protocol (MGCP) interface, or another standardized or proprietary interface.

In some cases, the method can also include determining with the media server control enabler a subsequent function of the media server based on the results received from the media server and requesting the subsequent function of the media server c via the southbound interface of the media server control enabler. In other cases, the application can determine a subsequent function of the media server based on the results received from the media server. In such a case, a request to perform the subsequent function of the media server can be received from the application via the northbound interface of the media server control enabler and the subsequent function of the media server can be requested via the southbound interface of the media server control enabler.

The media control functions of the media server can include, but are not limited to, one or more of a media streaming function, a media recording function, a media conversion function, a media mixing function, a set of one or more Video Cassette Recorder (VCR) functions, e.g., fast forward, fast rewind, forward, rewind, pause, etc., a voicemail function, a set of one or more conference functions, a media mute function, a media unmute function, etc.

The northbound interface or API of the media server control enabler can be implemented based on any of a variety of models. For example, the northbound interface can be implemented based on a call model or a call model. In other cases, the northbound interface can be implemented based on a model representing connections between media.

In some cases, the method can also include performing call control with the application. In other cases, call control can be performed by the media server control enabler. Performing call control with the media server control enabler can comprise, for example, requesting one or more call control functions of a call control enabler from the media server control enabler.

According to another embodiment, a method for controlling a media server can comprise detecting a network event by a media server control enabler, determining with the media server control enabler a media control function of the media server to perform based on the network event, and requesting the media control function of the media server via a southbound interface of the media server control enabler. The southbound interface can provide an interface specific to the media server. Results of the media function can be received from the media server via the southbound interface of the media server control enabler and provided via a northbound interface of the media server control enabler. The northbound interface, for example an API, can provide an abstract interface for interacting with the media server.

According to another embodiment, a media server control enabler can comprise an abstraction layer including one or more northbound interfaces providing an abstract interface for invoking one or more of a plurality of media functions of a media server. The media server control enabler can be adapted to receive a request to perform a media control function of the media server from an application via the northbound interface. The media server control enabler can also include one or more enabler instances. Each of the one or more enabler instances can provide a southbound interface. The southbound interface can provide an interface specific to the media server. The media server control enabler can be further adapted to request the media control function of the media server via the southbound interface. In some cases the media server control enabler can be further adapted to receive results of the media function from the media server via the southbound interface of the media server control enabler and return the results of the media function to the application via the northbound interface of the media server control enabler.

The northbound interface of the media server control enabler can comprise an Application Program Interface (API). The southbound interface of the media server control enabler can comprise one or more of a Session Initiation Protocol (SIP) interface, a Next Generation Networking (NGN) interface, a Public Switched Telephone Network (PSTN) interface, an Internet interface, a Parlay interface, a Netann interface, a Media Session Markup Language (MSML) interface, a Media Session Control Markup Language (MSCML) interface, a Mass Storage and Control Protocol (MSCP) interface, a Media Objects Markup Language (MOML) interface, a Media Gateway Control Protocol (MGCP) interface, or another standardized or proprietary interface.

According to yet another embodiment, a system can comprise a media server adapted to provide a plurality of media functions and a media server control enabler communicatively coupled with the media server. The media server control enabler can comprise an abstraction layer including one or more northbound interfaces providing an abstract interface for invoking one or more of the plurality of media functions of the media server, and one or more enabler instances, each of the one or more enabler instances providing a southbound interface providing an interface specific to the media server, wherein the media server control enabler is further adapted to request the media control function of the media server via the southbound interface. In some cases, the media server control enabler can be further adapted to receive a request to perform a media control function of the media server from an application via the northbound interface. In such cases, the media server control enabler can request the media control function of the media server via the southbound interface based on the request from the application. In other cases, the media server control enabler can be adapted to detect a network event via the northbound interface. In such cases, the media server control enabler can request the media control function of the media server via the southbound interface based on the network event.

DETAILED DESCRIPTION OF THE INVENTION

Figure 1:
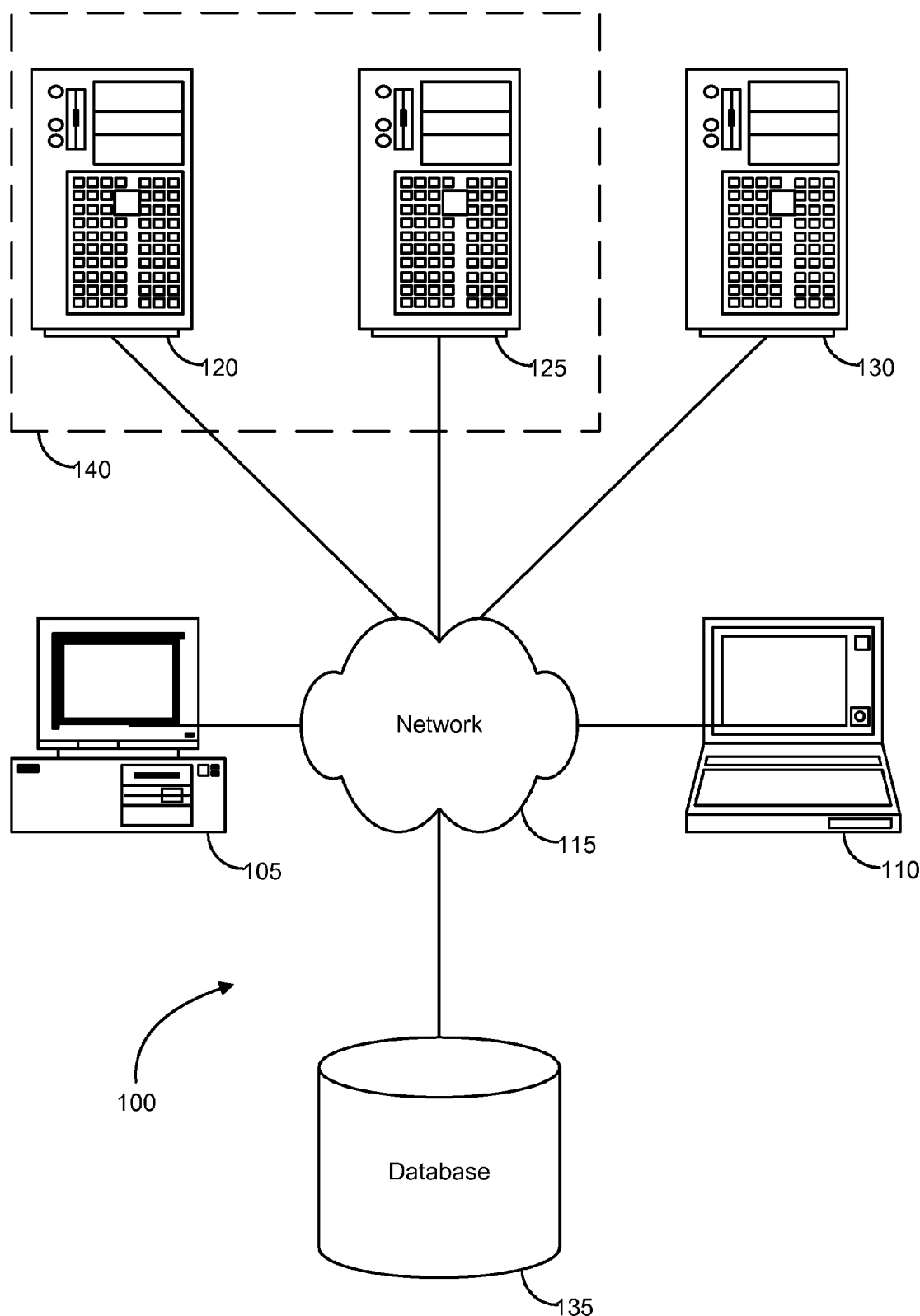
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for interacting with a media server via a network agnostic and/or protocol agnostic media server control enabler. As used herein, the term enabler refers to a reusable service layer component or components that provide an intrinsic function for use by others (other enablers, applications (i.e. services) or any authorized resource) through appropriate northbound interfaces. Intrinsic means that an enabler does not itself provide functions provided by other enablers nor functions based on service provider policies (e.g. messaging does not include authentication, charging, logging, etc.). These functions may be implemented by network resources, devices or OSS/BSS functions. An enabler accesses these resources and/or functions via any mechanism appropriate for the resource. That is, a southbound interface is not specified as part of the adapter, so it can be changed from resource to resource. However, northbound interfaces provided by an enabler may be standardized.

As will be described in detail below, a media server control enabler according to embodiments of the present invention can provide a northbound interface for invoking one or more of a plurality of media functions of a media server. The northbound interface represents an abstraction of the functions of the media server. Additionally, the media server control enabler can provide a southbound interface that is specific to interfaces and/or protocols of the media server. Therefore, the media server control enabler can receive a request to perform a media control function of the media server from an application via the northbound interface and in turn request the media function from the media server via the southbound interface. In this way, the applications using the media server control enabler to interact with the media server need not be aware of the interfaces and/or protocols used by the media server. Rather, the applications can interact with the media server control enabler via the abstracted northbound interface.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3 G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
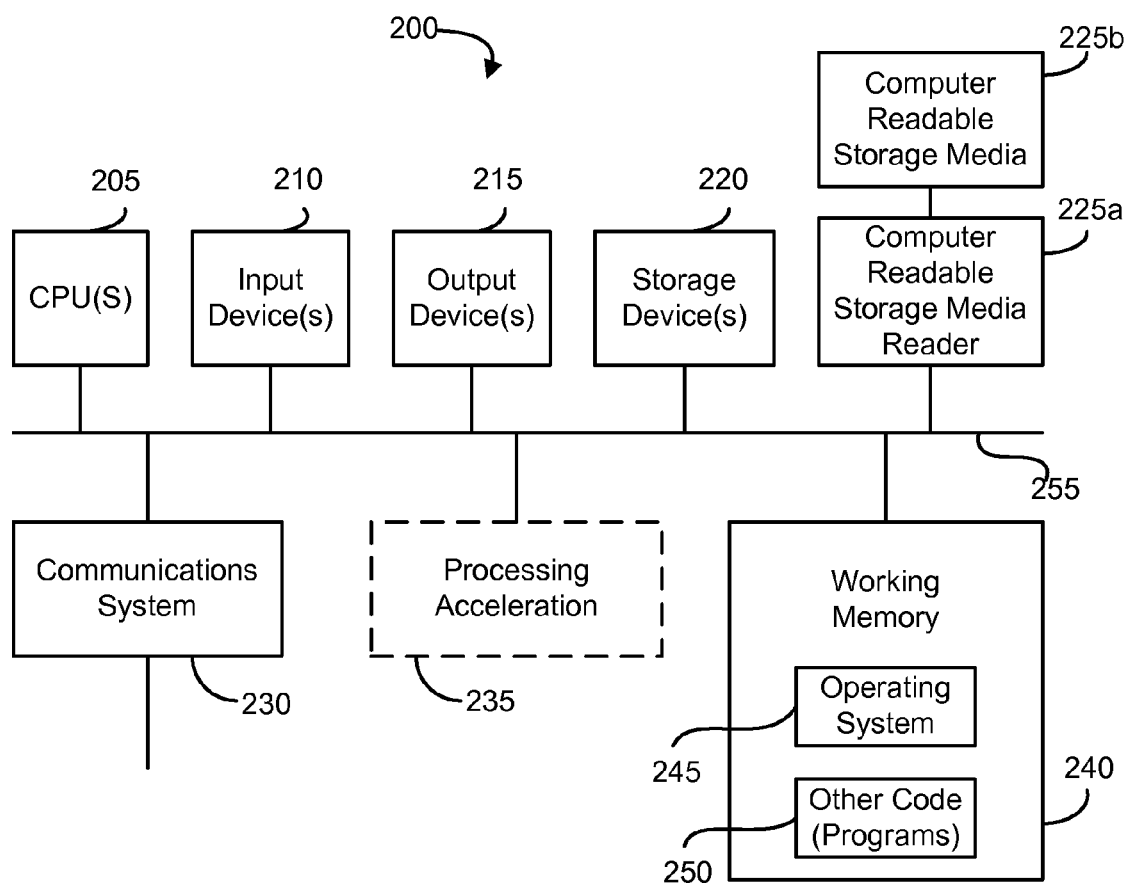
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
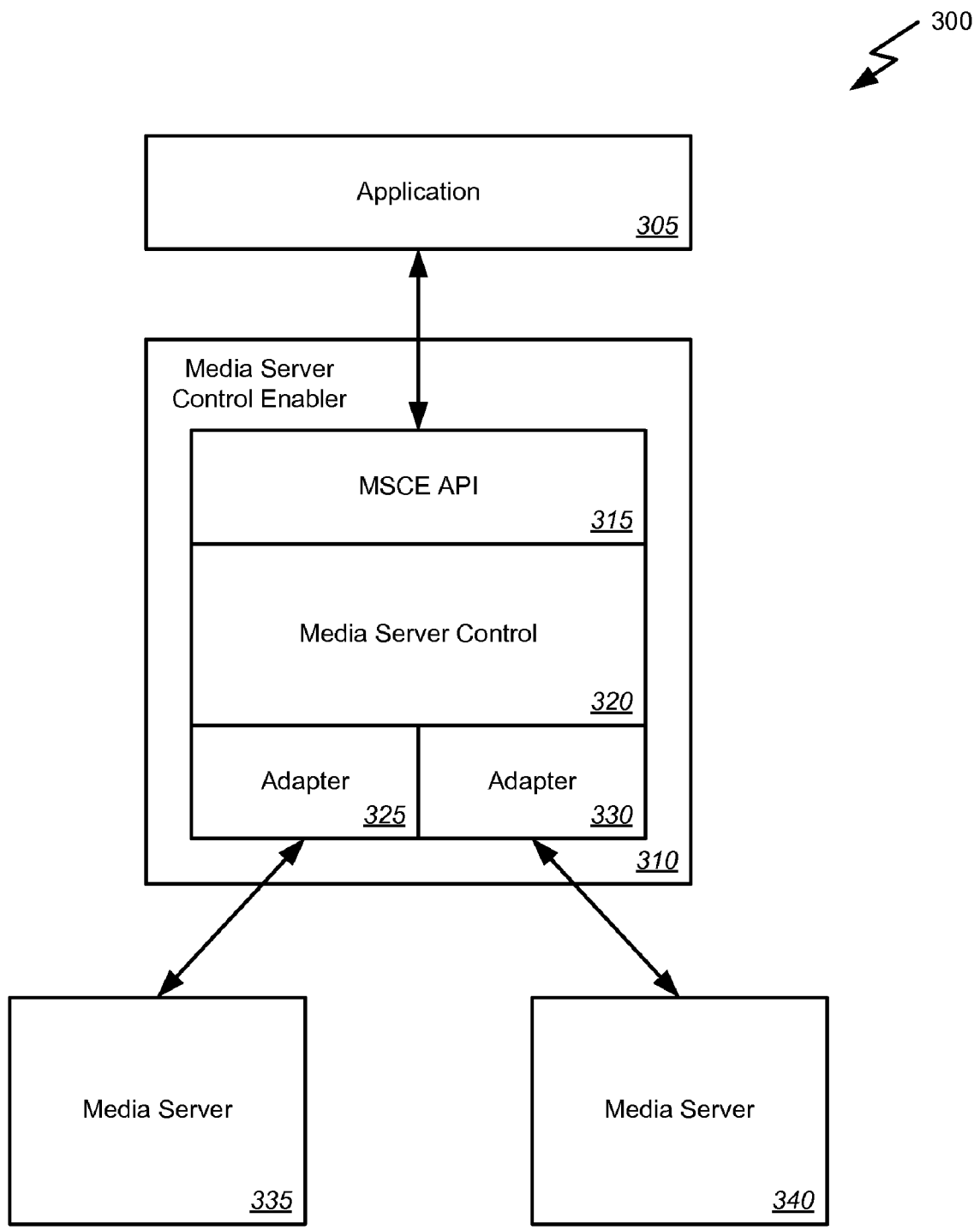
FIG. 3 is a block diagram illustrating, at a high level, a system for utilizing media functions of one or more media servers according to one embodiment of the present invention.

FIG. 3 is a block diagram illustrating, at a high level, a system for utilizing media functions of one or more media servers according to one embodiment of the present invention. In this example, the system 300 includes an application 305 executing on a user device, client computer, server, or any other device such as described above the application 305 can be any of a variety of custom or standard applications that may be utilize or interact with various forms of media including video, audio, etc. The application 305 can be in communication with a media server control enabler 310 via a network (not shown here) such as the Internet or another communication network such as described above.

The system can also include one or more media servers 335 and 340 in communication with the media server control enabler 310. The media server control enabler 310 may be communicatively coupled with the media servers 335 and 340 via a network (not shown here) such as the Internet or another communications network as described above. In other cases, while illustrated here as separate components, the media server control enabler 310 may be implemented as part of one or more of the media servers 335 and 340.

The media servers 335 and 340 can perform any of a variety of functions on different types of media such as audio, video, or other media. The media may be stored on the media servers 335 and 340 or on another computer or device in communication with the media servers 335 and 340. Functions performed by the media servers 335 and 340 can include, but are not limited to, media streaming functions, media recording functions, media conversion functions, media mixing functions, etc. The media servers 335 and 340 can, in some cases, provide functions for controlling the playback of stored media. For example, the media servers 335 and 340 can provide VCR-like functions such as fast forward, reverse, pause, etc. Additionally or alternatively, the media servers 335 and 340 can perform functions for controlling access to or participation in the media stream and/or other media control functions.

The media server control enabler 310 can include a northbound interface such as an Application Program Interface (API) 315. The API 315 can comprise, for example, a Parlay API or another API. Generally speaking, the northbound interface or API 315 represents an abstraction of the functions of the media servers 335 and 340. Via the API 315 the application 305 can request one or more of the media functions of the media servers 335 and 340 and may receive results of that processing.

Additionally, the media server control enabler 310 can provide southbound interfaces that are specific to interfaces and/or protocols of the media servers 335 and 340. The southbound interfaces can be implemented via one or more adapters 325 and 330 which can represent specific instances of the media server control enabler 310. That is, as will be discussed in greater detail below with reference to FIG. 5, the adapters 325 and 330 can represent specific instances of the enabler that implement an interface and/or protocol specific to the media server with which that adapter communicates. Therefore, while the northbound interface or API 315 provides to the application 305 an abstract interface to the functions of the media servers 335 and 340, the southbound interface or adapters 225 and 330 provide the specific interface to the media servers 335 and 340 based on the interface and/or protocols used by that media server.

The media server control enabler 310 may also include a media server control module 320 or logic. The media server control module 320 can provide logic for instantiating or initiating the adapters 325 and 330 based upon requests received via the API 315. Additionally or alternatively, the media server control module 320 can provide control of the media based on the requests received from the application 305 via the API 315, the results of the media server performing the requested media function, and/or the media itself.

Therefore, in use, the media server control enabler 310 can receive a request to perform a media control function of the media server from the application 310 via the northbound interface or API 315. The media server control enabler 310 can in turn request the media function from the media server 335 or 340 via the southbound interface or adapter 325 or 330. In this way, the application 305, using the media server control enabler 310 to interact with the media server 335 or 340, need not be aware of the interfaces and/or protocols used by the media servers 335 and 340. Rather, the application 305 can interact with the media server control enabler 310 via the abstracted northbound interface or API 315.

In some cases, the media or other results of the performance of the media function can be received from the media server 335 or 340 via the southbound interface or adapters 325 or 330 of the media server control enabler 310. The results can be returned to the application 305 via the northbound interface or API 315 of the media server control enabler 310 the application 305 may then, based on these results or on other conditions, request additional media functions, again via the API 315 of the media server control enabler 310.

Figure 4:
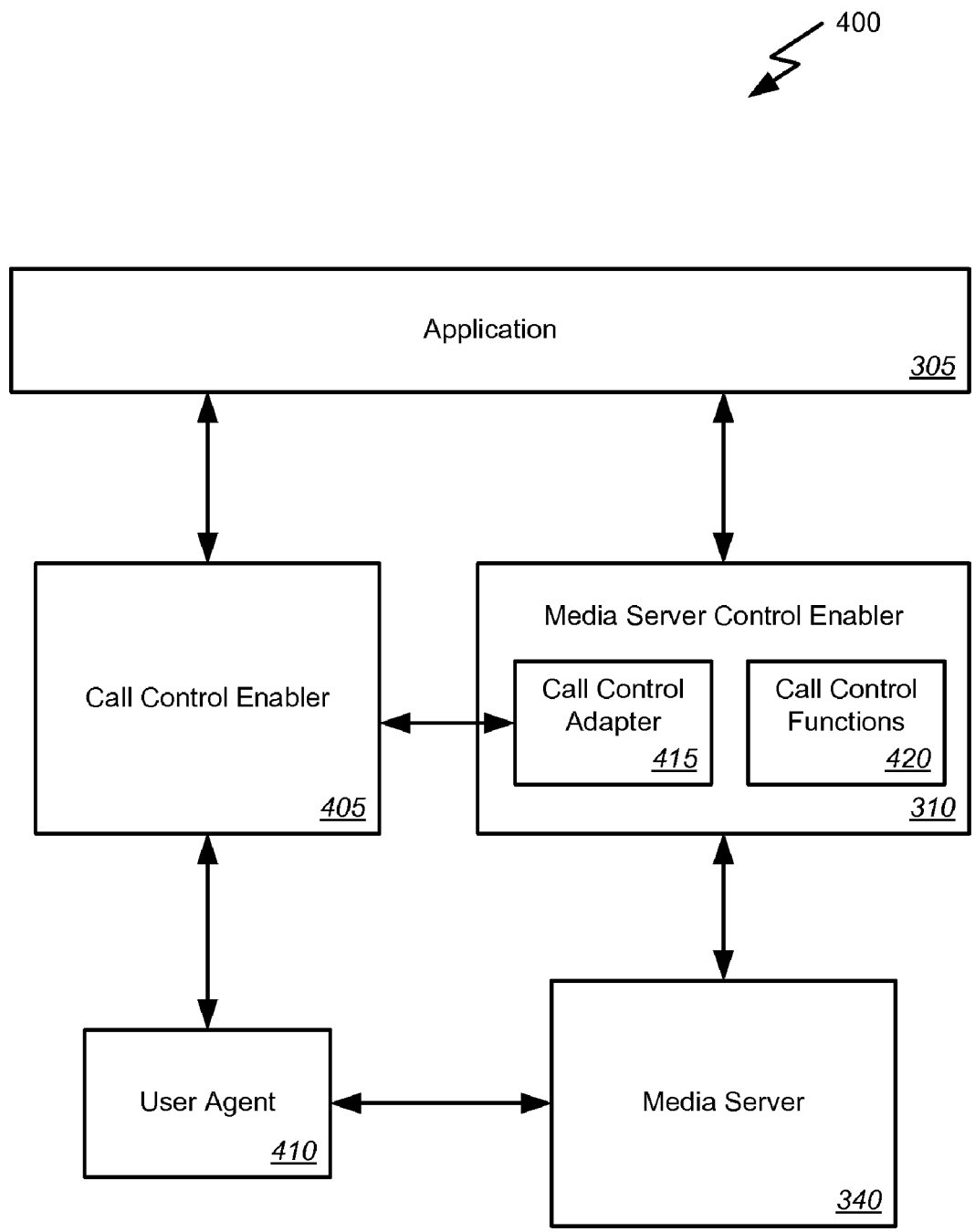
FIG. 4 is a block diagram illustrating an exemplary use of a media server control enabler according to one embodiment of the present invention.

FIG. 4 is a block diagram illustrating an exemplary use of a media server control enabler according to one embodiment of the present invention. As illustrated here, the system 400 includes an application 305 which may be executed, for example, on an application server or other device. The system can also include an initiating device or user agent 410 communicatively coupled with the application 305 via a communications network such as the Internet or other network as described above. The initiating user agent 410 can be adapted to initiate a communication session over the communications network via a signaling protocol, such as, for example, SIP. As described here, signaling is separated from the media exchanges. However, as can be understood by one skilled in the art, such separation is not required. Rather embodiments of the present invention can also be implemented in cases where the signaling and media exchanges are combined.

The application 305 can receive and process the communication. In other cases, rather than reacting to a communication from the initiating user agent 410, the application 305 may initiate the communication with the user agent 410. In either case, based on the application logic, the application 305 can perform call control. According to one embodiment, the application 305 can perform call control by requesting functions for interacting with other elements of the system provided by a call control enabler 405.

The call control enabler 405 can be adapted to receive a request to perform call control functions from the application 305, for example via the signaling protocol. For example, receiving a request to perform call control functions from the initiating user agent 410 via the signaling protocol can comprise receiving the request via an Application Program Interface (API) of a call control enabler 405. An exemplary call control enabler that may be utilized in such an embodiment is described in U.S. patent application Ser. No. 11/949,930, filed Dec. 4, 2007 by Maes and entitled "Call Control Enabler Abstracted from Underlying Network Technologies", of which the entire disclosure is incorporated herein by reference for all purposes. The application 305 can maintain control of the call and request execution of a dialog or another media function by the media server 340 via the media server control enabler 310 as described above.

So in use, for example, the application 305, via the call control enabler 405, can invite the user agent 410 to join a conference with the media server 340. Additionally, via the media server control enabler 310, the application 305 can request the media server 340 to participate in the conference. During the conference, the media server can interact with the user agent 410 and receive information from the user agent. For example, the media server 340 may receive Dual-Tone Multi-Frequency (DTMF) keys for such functions as floor requests, mute, hold, change volume, etc. These events can be passed back to the application 305 via the media server control enabler 310. The application 305 can then react to the events and request appropriate media functions from the media server 340 via the media server control enabler 310. Thus, while the media server 340 provides the media functions to support the conference, the application 305 drives the conference by requesting media functions of the media server 340 via the media server control enabler 310 based on information and events collected and detected by the media server 340 and returned to the application 305 via the media server control enabler 310.

According to another embodiment, rather than the application 305 performing call control, e.g., via the call control enabler 405 or a set of call control functions of the application or another element, and the media server control enabler 310 reacting thereto, the media server control enabler may be adapted to perform some or all call control itself. For example, the media server control enabler 310 can comprise logic or be adapted to detect and react to a network event such as a call from the user agent 410 or receive and react to requests from the applications 305. According to one embodiment, the media server control enabler 310 can include a call control adapter 415 for interfacing with, i.e., calling the call control functions of, the call control enabler 405. In such a case, when the media server control enabler 310 detects a network event such as a call from the user agent 410, or when requested by the application 305, the media server control enabler 310 can determine how to react to the call or request and request call control functions of the call control enabler 405, for example via the API of the call control enabler 405, as appropriate. In such a manner, the media server control enabler 310 can, for example, initiate a session with the user agent, invite other user agents (not shown here) to participate, end the session, etc.

According to yet another embodiment, rather than utilizing a separate call control enabler 405 or other separate set of call control functions, the media server control enabler 310 may include a set of call control functions 420. In such a case, rather than the application 305 performing call control via the call control enabler 405 or the media server control enabler 310 performing call control by requesting call control function of the call control enabler 405, the media server control enabler 310 can be adapted to perform some or all call control itself via the set of call control functions 420 of the media server control enabler 310. For example, the media server control enabler 310 can comprise logic or be adapted to detect and react to a network event such as a call from the user agent 410 or receive and react to requests from the applications 305. In such a case, when the media server control enabler 310 detects a network event such as a call from the user agent 410, or when requested by the application 305, the media server control enabler 310 can determine how to react to the call or request and perform call control functions 420 itself, as appropriate.

Figure 5:
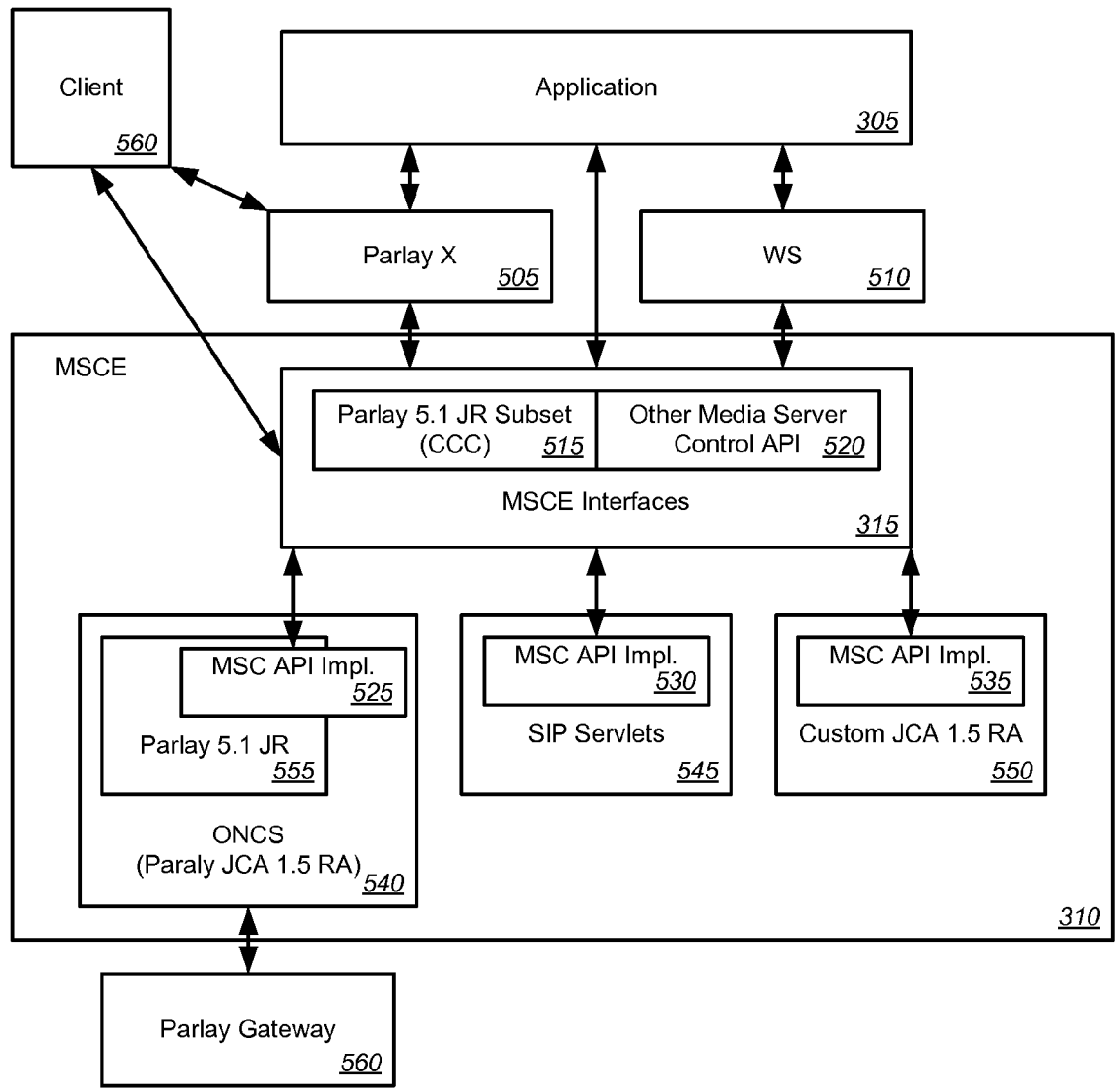
FIG. 5 is a block diagram illustrating additional details of a media server control enabler according to one embodiment of the present invention.

FIG. 5 is a block diagram illustrating additional details of a media server control enabler according to one embodiment of the present invention. As illustrated here, the media server control enabler 310 can comprise an abstraction layer including one or more northbound interfaces 315 providing an abstract interface for invoking one or more of a plurality of media functions of a media server. For example, the northbound interfaces 315 of the media server control enabler 310 can comprise an Application Program Interface (API) such as a Parlay Conference Call Control API 515, implemented for example as a Parlay X 2.1 API, or other media server control API 520. The northbound interfaces 315 of the media server control enabler 310 can receive requests for media functions from the application 305 directly or via other components such as a Parlay X module 505, a web service 510, or other component based on the implementation.

The media server control enabler 310 can also include one or more enabler instances 540-550. As noted above, each of the one or more enabler instances 540-550 can provide a southbound interface 525-535. The southbound interfaces 525-535 of each instance 540-550 can provide an interface 525-535 specific to the media server supported by that instance 540-550. For example, the southbound interfaces 525-535 of the media server control enabler 310 can comprise one or more of a Session Initiation Protocol (SIP) interface 545 for interfacing with a SIP network (not shown here), a Public Switched Telephone Network (PSTN) interface for interfacing with a PSTN network, a Parlay interface 540, implemented for example as a Parlay JCA 1.5 resource adapter (RA), for interfacing with a Parlay gateway 560, a Netann interface, a Media Session Markup Language (MSML) interface, a Media Session Control Markup Language (MSCML) interface, a Mass Storage and Control Protocol (MSCP) interface, a Media Objects Markup Language (MOML) interface, a Media Gateway Control Protocol (MGCP) interface, or another standardized or proprietary interface, as well as custom adapters 550, implemented for example as a JCA 1.5 RA.

The media server control enabler 310 can be further adapted to request the media control function of the media server via the southbound interface 525-535. In some cases the media server control enabler 310 can be further adapted to receive results of the media function from the media server via the southbound interfaces 525-535 of the media server control enabler 310 and return the results of the media function to the application 305 via the northbound interface 315 of the media server control enabler 310.

According to one embodiment, in addition or as an alternative to the application 305 requesting media control functions of the media server control enabler 310 via the northbound interfaces 315 of the media server control enabler 310, a client application or device can request outband media control from the media server control enabler 310. For example, a client 310 can request media control functions of the media server control enabler 310 via the northbound interfaces 315 of the media server control enabler 310 directly or via other components such as a Parlay X module 505, a web service 510, or other component based on the implementation.

Figure 6:
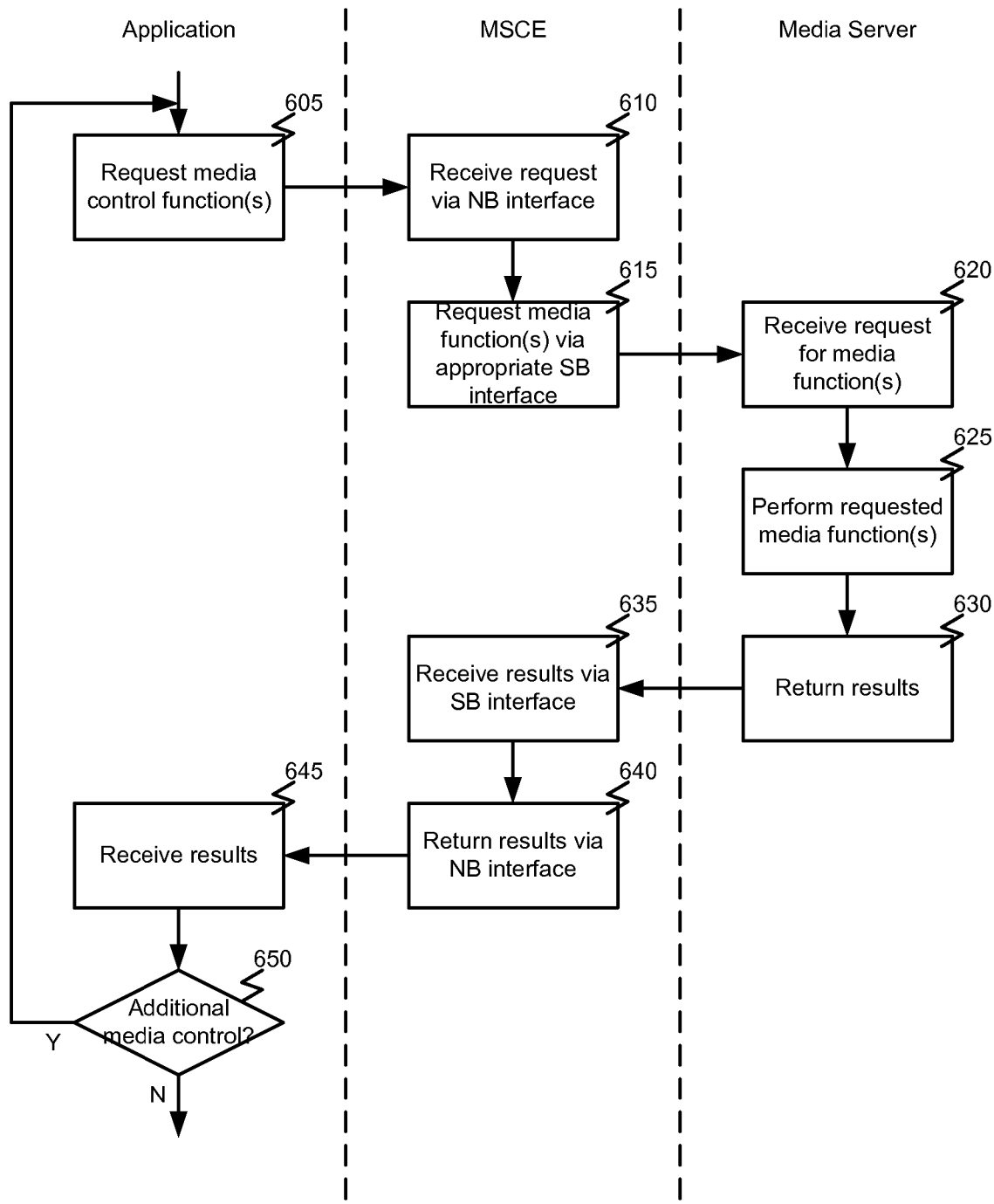
FIG. 6 is a flowchart illustrating a process for performing media functions according to one embodiment of the present invention.

FIG. 6 is a flowchart illustrating a process for performing media functions according to one embodiment of the present invention. In this example, processing begins with the application requesting 605 one or more media functions of the media server via the abstract northbound interface of the media server control enabler. The media server control enabler receives 610 the request to perform a media control function of the media server from the application via the northbound interface of a media server control enabler. The media control function of the media server can be requested 615 by the media server control enabler via a southbound interface of the media server control enabler.

The media server can receive 620 the request from the media server control enabler and perform 625 the requested media function. As noted above, the media functions of the media server that can be invoked or accessed through the northbound interface can include, but are not limited to, a media streaming function, a media recording function, a media conversion function, a media mixing function, etc. Furthermore, as noted above, performing 625 the media functions can include the media server generating results, collecting information from the user, or detecting events such as a DTMF key. Therefore, the media server can return 630 such results or events to the media server control enabler via the southbound interfaces of the media server control enabler.

The media server control enabler can receive 635 the results of the media function from the media server via the southbound interface of the media server control enabler and return 640 the results of the media function to the application via the northbound interface of the media server control enabler. The application can in turn receive 645 the results from the media server control enabler via the northbound interface of the media server control enabler and determine 650 whether to perform additional media functions. If a determination 650 is made to perform addition media functions, the application can again request 605 the media control functions via the northbound interface of the media server control enabler.

According to another embodiment, the media server control enabler can be additionally or alternatively adapted to react to network events. That is, in addition to or instead of the media server control enabler receiving and reacting to requests from the application or other requester, the media server control enabler can be adapted to detect various network events, e.g., calls etc., determine how to react to those events, and perform various media control functions based on those determinations.

Figure 7:
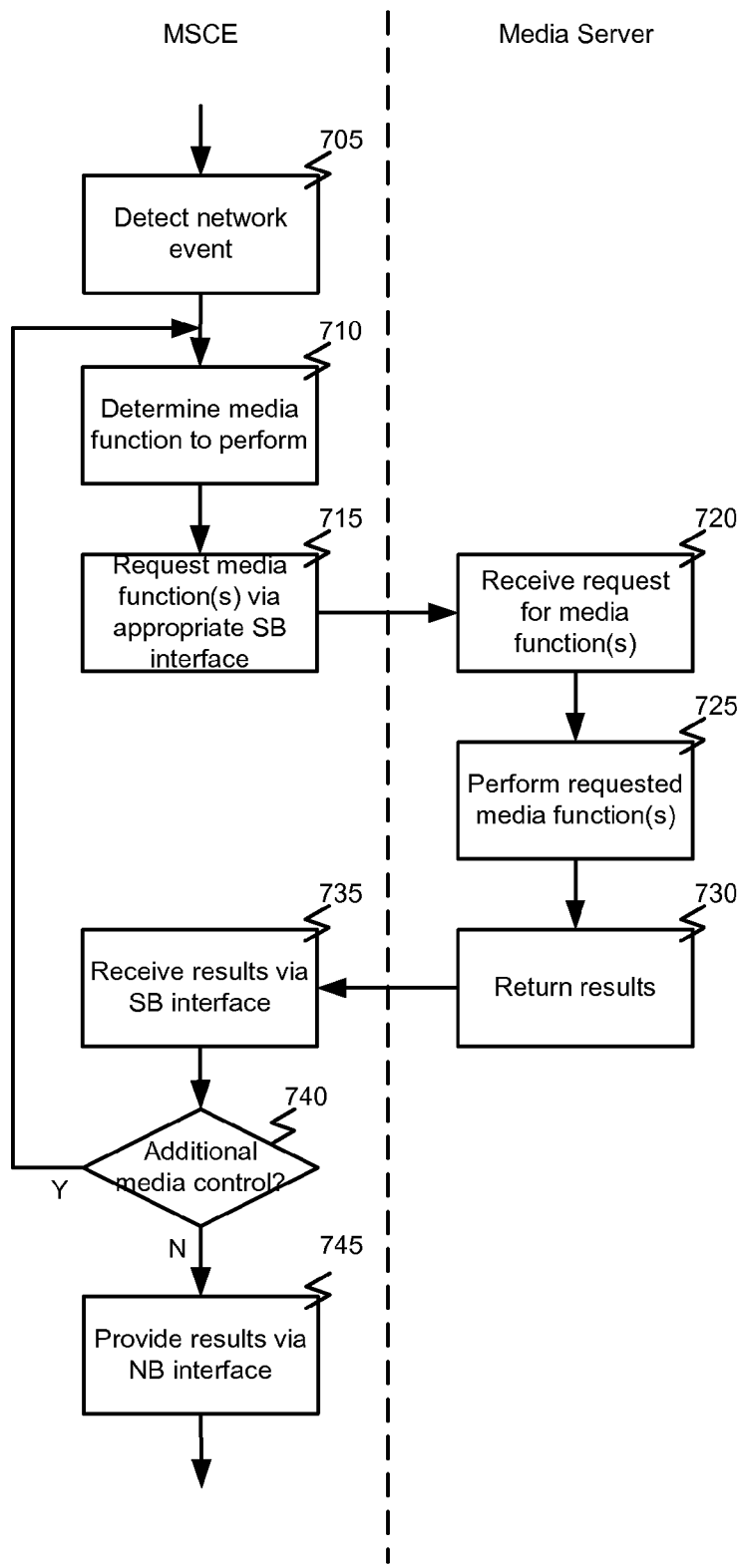
FIG. 7 is a flowchart illustrating a process for performing media functions according to an alternative embodiment of the present invention.

FIG. 7 is a flowchart illustrating a process for performing media functions according to an alternative embodiment of the present invention. This example illustrates the case in which the media server control enabler detects and reacts to network events. In this example, the process begins with the media server control enabler detecting 705 a network event. A determination of a media control function of the media server to perform can be made by the media server control enabler based on the network event. For example, the determination 710 can be based on the device, endpoint, or other resource originating the event, the type of event detected, or another criteria. The media server control enabler can then request 715 the media control function of the media server via a southbound interface of the media server control enabler.

The media server can receive 720 the request from the media server control enabler and perform 725 the requested media function. As noted above, the media functions of the media server that can be requested can include, but are not limited to, a media streaming function, a media recording function, a media conversion function, a media mixing function, etc. Furthermore, as noted above, performing 725 the media functions can include the media server generating results, collecting information from the user, or detecting events such as a DTMF key. Therefore, the media server can return 730 such results or events to the media server control enabler via the southbound interfaces of the media server control enabler.

The media server control enabler can in turn receive 735 results of the media function from the media server via the southbound interface of the media server control enabler and determine 740 whether to perform additional media functions. If a determination 740 is made to perform addition media functions, the media server control enabler can again determine 710 one or more media functions to perform and request 715 the media functions from the media server via the southbound interface of the media server control enabler. Optionally, results of the media function(s) can be provided 745 via the northbound interface of the media server control enabler.

As noted above, the northbound API of the media server control enabler can vary significantly depending upon the exact implementation of the various embodiments of the present invention. However, for illustrative purposes, some exemplary models for implementing the API are provided. It should be understood that various details of other implementations can vary significantly from the examples provided here without departing from the scope of the present invention.

Figure 8:
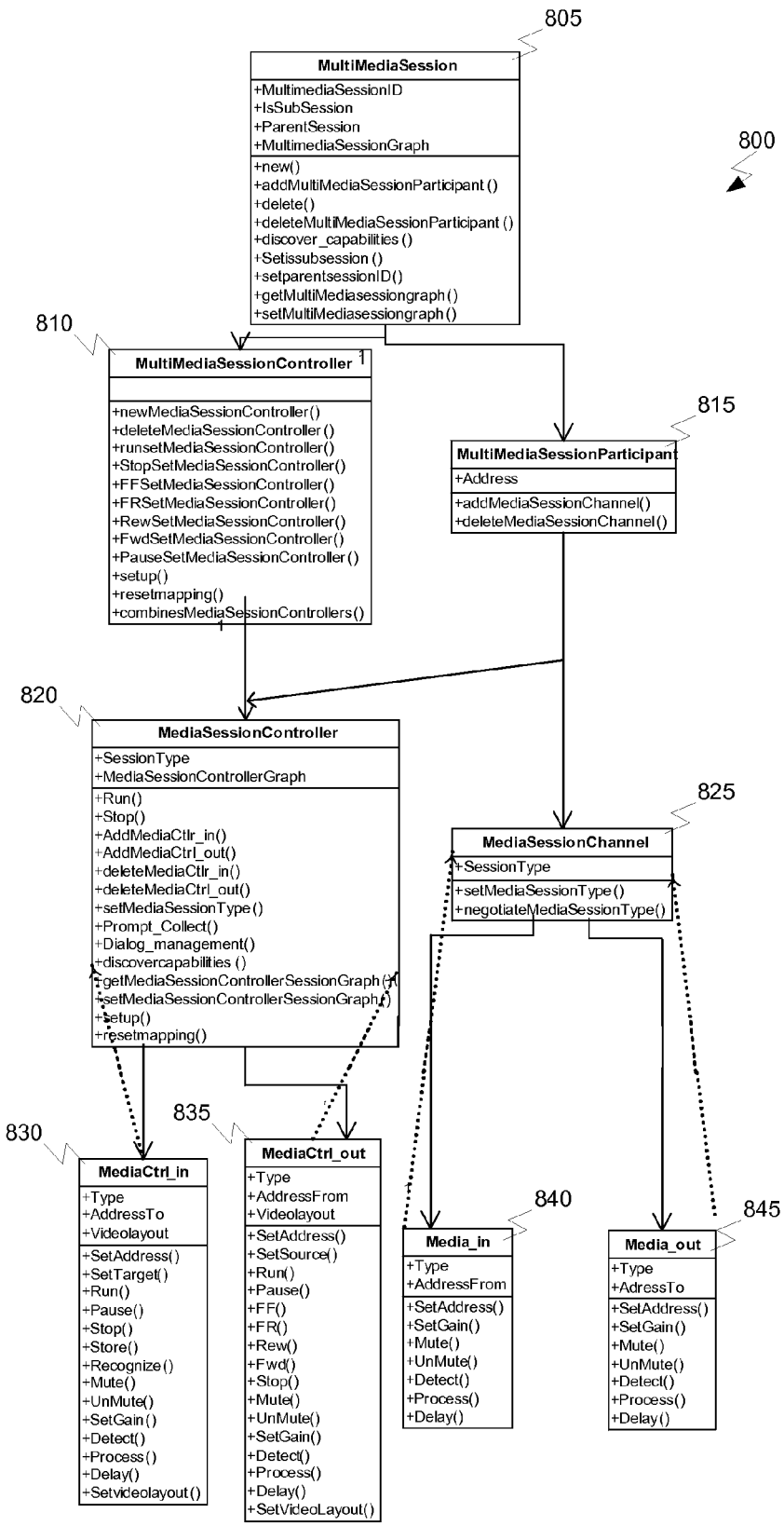
FIG. 8 illustrates an object model of an exemplary northbound interface of a media server control enabler according to one embodiment of the present invention.

FIG. 8 illustrates an object model of an exemplary northbound interface of a media server control enabler according to one embodiment of the present invention. It should be understood that this object model is offered by way of example only and is not intended to limit the scope of the present invention. Rather, other object models and interfaces are contemplated and considered to be within the scope of the present invention. As illustrated here, the object model 800 of the northbound interface or API of the media server control enabler can include a main object, the MultiMediaSession object 805. The MultiMediaSession object 805 can consists of a MultiMediaSessionController object 810 and one or more MultiMediaSessionParticipants objects 815. Each of the MultiMediaSessionParticipants objects 815 can have a different MediaSessionChannel object 825 with a Media_in object 840 and a Media_out object 845. For each MediaSessionChannel.SessionType property of the MediaSessionChannel object 825, there can be one or more corresponding MediaSessionController objects 820 of the same .SessionType with one or more MediaCtrl_in objects 830 and one or more MediaCtl_out objects 835.

Generally speaking, operations apply to a MultiMediaSession object 805. The MultiMediaSessionPaticipants object 815 can contribute MediaSessionChannel objects 825 with Media_in and Media_out objects 840 and 845. The MultiMediaSession object 805 can process, e.g., combine, transform, etc., the different media into different MediaSessionController.MediaCtrl_in and MediaSessionController.MediaCtrl_out objects 830 and 835. The MediaSessionController.MediaCtrl_in object 830 can be used for internal processing. The MediaSessionController.MediaCtrl_out object can be used for distribution to participants or other MediaSessionsController objects 820. In one implementation, by default there is can be one MediaSessionController object 820 per involved types that are present. The Media_in object 840 of the same types can be mixed in the MediaSessionController.MediaCtrl_out object 835 and the Media_out object 845 of the same type can consume the MediaSessionController.MediaCtrl_in.

As noted above, the MultiMediaSession object 805 is the main session for a set of MultiMediaSession participants or can be a temporary sub-MultimediaSession of another main session. The MultiMediaSession object 805 can have a number of properties including but not limited to a MultiMediaSessionID property that provides an identifier of the MultiMediaSession object 805. The IsSubSession property of the MultiMediaSession object 805 can indicate if this session is a main session or subsession of a main session. A ParentSession property can indicate the identity of a parent MultimediaSession object in case of a sub-MultiMediaSession. The MultimediaSessionGraph property denote a graph of the sessions as returned by the getMultiMediasessiongraph method of the MultiMediaSession object 805.

The MultiMediaSession object 805 can also provide a number of methods. For example, a New( ) method of the MultiMediaSession object 805 can create a new MultiMediaSession object 805 empty or default if Participants are passed. The addMultimediaSessionParticipant( ) method can be invoked to add a participant to the MultiMediaSession. The Delete( ) method of the MultiMediaSession object 805 can delete the MultiMediaSession. The deleteMultiMediaSessionparticipant( ) method can be invoked to remove a Participant to the MultiMediaSession. The discover_capabilities( ) method can allow the requester to discover the capabilities of the MultimediaSession or MediaSessionController. Setissubsession( ) can define the current session as a subsession or not. The setparentsessionID( ) method can be invoked to select a parent MultiMediaSession object. As introduced above, the getMultiMediaSessiongraph( ) method of the MultiMediaSession object 805 can returns the MultiMediaSessionGraph, i.e., returns a graph of the relationships between participants Media-in and Media out and different MediaSessionController.MediaCtrl_in and MediaSessionController.mediaCtrl_out. The setMultiMediaSessiongraph( ) method can be invoked to set a certain MultiMediaSessionGraph that the MultiMediaSession object 805 will implement.

Similarly the MediaSessionController object 820 can include a number of properties and methods. For example, the SessionType property of the MediaSessionController object 820 can define whether the session is a video session, a video/audio session or another type of session. Thus, Voice/Audio processing assumes MediaSessionController.SessionType property of appropriate types and Video processing and attributes assume MediaSessionController.SessionType property of appropriate types.

The MultiMediaSessionParticipant object 815 can include, for example, an Address property. The Address property can define the address of the remote Participants as appropriate, e.g., IP, URI, Socket, or other address. The addMediaSessionChannel( ) method of the MultiMediaSessionParticipant object 815 can be invoked to add a media type/Media_in and Media_out channel for a participant (e.g. add video to audio). Similarly, the deleteMediaSessionChannel( ) of the MultiMediaSessionParticipant object 815 can be invoked to remove a media type/Media_in and Media_out channel for a participant (e.g. add video to audio).

The Media_in object 840 and the Media_out object 845 can each include a Mute( ) method and an UnMute( ) method for muting and unmuting a line for a participant. Similarly, the MediaCtrl_in object 830 and MediaCtrl_out object 835 can also include a Mute( ) method and an UnMute( ) method for muting and unmuting a line or channel. The MediaCtrl_in object 830 can also include Run( ), Pause( ), and Stop( ) methods which can be invoked to control the play of media as the names of the methods imply. Additionally, the MediaCtrl_in object 830 can include a Store( ) method for recording received media. The MediaCtrl_out object 835 can also include Run( ), Pause( ), FF( ), FR( ), Rew( ), Fwd( ), and Stop( ) methods which can be invoked to control the play of media as the names of the methods imply.

Therefore, by instantiating a MultiMediaSession object 805 as illustrated in FIG. 8 upon the initiation of a session, the session can be controlled and participated in through the various properties and methods exposed by the objects, i.e., via the northbound interface or API of the media server control enabler. For example, a northbound interface or API of a media server control enabler implemented following this object model can be invoked or instantiated by an application via the New( ) method of the MultiMediaSession object 805 and a session can be initiated and participants invited and added to the session via methods of the various objects such as the addMultiMediaSessionParticipant( ) method of the MultiMediaSession object 805 and the addMediaChannel( ) method of the MultiMediaSessionParticipant object 815. The AddMediaCtlr_in( ) and AddMediaCtlr_out( ) methods of the MediaSessionController object 820 can be invoked to instantiate MediaCtrl_in and MediaCtrl_out objects 830 and 835 to support the media to be played and/or consumed during the session. Further, via the exposed methods of the MediaCtrl_in and MediaCtrl_out objects 830 and 835, the application and/or the media server control enabler can interact with the media functions of the media server as described above. That is, via these methods, the media server control enabler can be used to control functions of the media server to play media, record media, etc. For example, the application and/or media server control enabler can use these methods to play voicemail messages recorded by the media server, play and/or record voice, other audio, video, or other media on the media server, mixing media of the media server, playing prompts and collecting responses, for example via DTMF, conduct conferencing between participants, providing floor control for the conference, etc.

According to another embodiment, an object model for a northbound interface or API of a media server control enabler can be implemented that includes a MultiMediaSession object 805, a MultiMediaSessionController object 810 and MediaCtrl_in and MediaCtrl_out objects 830 and 835 as described above. This model can also include MultimediaSessionParticipants objects 815 and Media_in and Media_out objects 840 and 845 as described above. However, in this model, the media types contributed and consumed by MediaCtrl_in and MediaCtrl_Out objects 830 and 835 for a given MultiMediaSessionController object 810 or by Media_in and Media_out objects 840 and 845 are assumed to be of the same type.

Figure 9:
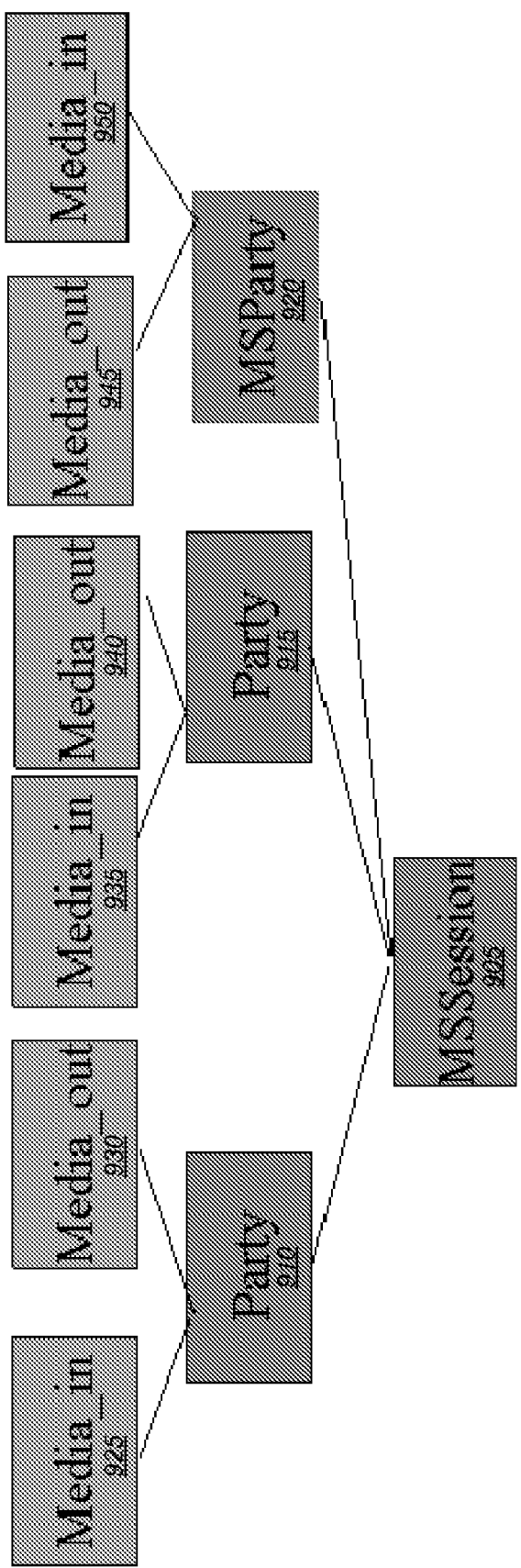
FIG. 9 is a block diagram illustrating an object model of an exemplary northbound interface of a media server control enabler according to an alternative embodiment of the present invention.

FIG. 9 is a block diagram illustrating an object model of an exemplary northbound interface of a media server control enabler according to this embodiment of the present invention. In this example, a media session, i.e., the main object, is represented by the MSSession object 905. The MSSession object can be similar to the MultiMediaSession object 805 described above. The session 905 has incoming (Media_in) objects 925, 935, and 950 for processing incoming media from the parties 910-920 and outgoing media (Media_out) objects 930, 940, and 945 for processing media going out to the parties 910-920. the Media_in objects 925, 935, and 950 can be similar to the Media_in object 840 described above and the Media_out objects 930, 940, and 945 can be similar to the Media_out 845 object also described above.

The MSSession object can be invoked or instantiated by an application upon the initiation of a session and a party's Media_out object 930, 940, or 945 and/or Media_in object 925, 935, or 950 can be added to the MSSession object 905. Operations on the media of the media server can be performed by the MSSession object 905. Media from the outgoing MSSession media_out object 945 can be played to parties 910 or 915 that support that media type, i.e., to parties 910 or 915 with a media_in object 925 or 935 that support that media type. Parties 910 or 915 with a media_in object 925 or 935 that do not support that media type can ignore the played media. The MSSession object 905 can play the media as configured, can be stopped to reconfigure, or can be configured on the fly.

Similar to the previous model, via the exposed methods of the Media_in objects 925, 935, and 950 and the Media_out objects 930, 940, and 945, the application and/or the media server control enabler can interact with the media functions of the media server as described above. That is, via these methods, the media server control enabler can be used to control functions of the media server to play media, record media, etc. For example, the application and/or media server control enabler can use these methods to play voicemail messages recorded by the media server, play and/or record voice, other audio, video, or other media on the media server, mixing media of the media server, playing prompts and collecting responses, for example via DTMF, conduct conferencing between participants, providing floor control for the conference, etc.

Figure 10:
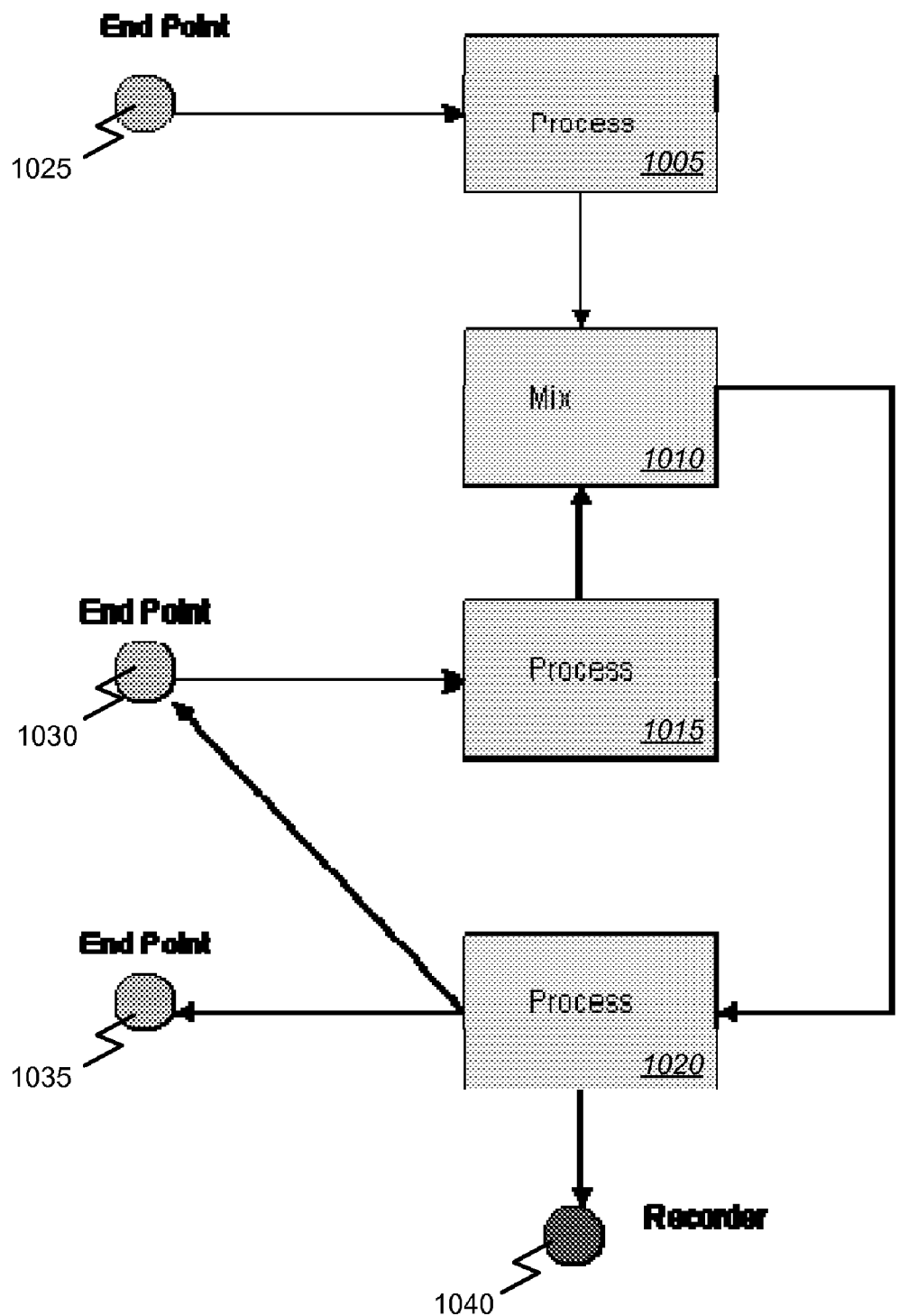
FIG. 10 is a block diagram illustrating an object model of an exemplary northbound interface of a media server control enabler according to yet another alternative embodiment of the present invention.

According to yet another embodiment, an object model for a northbound interface or API of a media server control enabler can be implemented that represents or describes connections between media. FIG. 10 is a block diagram illustrating an object model of an exemplary northbound interface of a media server control enabler according to this embodiment of the present invention. In this example, the model includes a set of processes 1005 and 1015, e.g., methods of one or more objects similar to the Media_in objects described above, for receiving media from a set of endpoints 1025 and 1030 such as devices, a media server or servers, etc. These processes 1005 and 1015 can invoke, request, instantiate, or otherwise initiate another process or module 1010 of the media server to mix the media received from the endpoints 1025 and 1030. The mixing process or module 1010 can in turn invoke, request, instantiate, or otherwise initiate yet another process 1020, e.g., a method of one or more objects similar to the Media_out objects described above, for playing the mixed media to another endpoint 1035, a recorder 1040, etc.

It should be understood that, regardless of the object model used to implement the northbound interface or API of the media server control enabler, the basic functions of the media server control enabler as described above can be provided via the different models. That is, the various models described above represent various possible implementations of the northbound interface of the media server control enabler.

Regardless of the exact implementation, the northbound interface provides an abstraction of the functions of the media server through which applications or other endpoints can request media control functions of the media server. The media control function of the media server can be then be requested and results can be received by the media server control enabler via the southbound interface of the enabler.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for controlling a media server, the method comprising:
   receiving a request to perform a media control function of the media server from an application via a northbound interface of a media server control enabler, the northbound interface providing an abstract, network agnostic interface for invoking one or more of a plurality of media functions of the media server, wherein the media server control enabler is between the application and the media server and wherein the application interacts with the media server through the media control enabler; and
   requesting the media control function of the media server via a southbound interface of the media server control enabler, the southbound interface providing an interface specific to the media server regardless of a network or protocol of the northbound interface.

2. The method of claim 1, further comprising:
   receiving results of the media function from the media server via the southbound interface of the media server control enabler; and
   returning the results of the media function to the application via the northbound interface of the media server control enabler.

3. The method of claim 2, further comprising:
   determining with the media server control enabler a subsequent function of the media server based on the results received from the media server; and
   requesting the subsequent function of the media server via the southbound interface of the media server control enabler.

4. The method of claim 2, further comprising:
   determining with the application a subsequent function of the media server based on the results received from the media server;
   receiving a request to perform the subsequent function of the media server from the application via the northbound interface of the media server control enabler; and
   requesting the subsequent function of the media server via the southbound interface of the media server control enabler.

5. The method of claim 1, wherein the media control function of the media server comprises a media streaming function.

6. The method of claim 1, wherein the media control function of the media server comprises a media recording function.

7. The method of claim 1, wherein the media control function of the media server comprises a media conversion function.

8. The method of claim 1, wherein the media control function of the media server comprises a media mixing function.

9. The method of claim 1, wherein the media control function of the media server comprises a set of one or more Video Cassette Recorder (VCR) functions.

10. The method of claim 1, wherein the media control function of the media server comprises a voicemail function.

11. The method of claim 1, wherein the media control function of the media server comprises a set of one or more conference functions.

12. The method of claim 1, wherein the media control function of the media server comprises a media mute function.

13. The method of claim 12, wherein the media control function of the media server comprises a media unmute function.

14. The method of claim 1, further comprising performing call control with the application.

15. The method of claim 1, further comprising performing call control with the media server control enabler.

16. The method of claim 15, wherein performing call control with the media server control enabler comprises requesting one or more call control functions of a call control enabler from the media server control enabler.

17. A method for controlling a media server, the method comprising:
   detecting a network event by a media server control enabler, wherein the media server control enabler is between a plurality of network end points and the media server and wherein the plurality of network endpoints interact with the media server through the media control enabler;
   determining with the media server control enabler a media control function of the media server to perform based on the network event; and
   requesting the media control function of the media server via a southbound interface of the media server control enabler, the southbound interface providing an interface specific to the media server and regardless of a network or protocol of a northbound interface of the media server control enabler.

18. The method of claim 17, further comprising:
   receiving results of the media function from the media server via the southbound interface of the media server control enabler; and
   providing the results of the media function via the northbound interface of the media server control enabler, the northbound interface providing an abstract interface for interacting with the media server and wherein a protocol of the northbound interface is different from a protocol of the southbound interface.

19. A media server control enabler comprising:
an abstraction layer including one or more northbound interfaces providing an abstract, network agnostic interface for invoking one or more media functions of a plurality of media servers, wherein the media server control enabler is adapted to receive a request to perform a media control function of one of the media servers from an application via the northbound interface; and
a plurality of enabler instances, each of the plurality of enabler instances providing a southbound interface providing an interface specific to one of the media servers regardless of a network or protocol of the northbound interface, wherein the media server control enabler is further adapted to request the media control function of one of the media servers via the southbound interface, wherein enabler instance is between a plurality of network end points and the media server and wherein the plurality of network endpoints interact with the media server through the media control enabler.

20. The media server control enabler of claim 19, wherein the media server control enabler is further adapted to receive results of the media function from the media server via the southbound interface of the media server control enabler and return the results of the media function to the application via the northbound interface of the media server control enabler.

21. The media server control enabler of claim 19, wherein the media server control enabler is further adapted to detect a network event via the northbound interface and request a media control function of one of the media servers via the southbound interface based on the network event.

22. The media server control enabler of claim 19, wherein the northbound interface of the media server control enabler comprises an Application Program Interface (API).

23. A system comprising:
a media server adapted to provide a plurality of media functions; and
a media server control enabler communicatively coupled with the media server and comprising an abstraction layer including one or more northbound interfaces providing an abstract, network agnostic interface for invoking one or more of the plurality of media functions of the media server, and one or more enabler instances, each of the one or more enabler instances providing a southbound interface providing an interface specific to the media server and regardless of a network or protocol of the northbound interface, wherein the media server control enabler is further adapted to request the media control function of the media server via the southbound interface, wherein enabler instance is between a plurality of network end points and the media server and wherein the plurality of network endpoints interact with the media server through the media control enabler.

24. The system of claim 23, wherein the media server control enabler is further adapted to receive a request to perform a media control function of the media server from an application via the northbound interface and wherein the media server control enabler requests the media control function of the media server via the southbound interface based on the request from the application.

25. The system of claim 23, wherein the media server control enabler is further adapted to detect a network event via the northbound interface and wherein the media server control enabler requests the media control function of the media server via the southbound interface based on the network event.

\* \* \* \* \*

UNITED STATES PATENT AND TRADEMARK OFFICE
CERTIFICATE OF CORRECTION

PATENT NO. : 7,853,647 B2
APPLICATION NO. : 11/877129
DATED : December 14, 2010
INVENTOR(S) : Stephane H. Maes It is certified that error appears in the above-identified patent and that said Letters Patent is hereby corrected as shown below:

In column 6, line 34, after "network" delete "may".

In column 13, line 35, delete "AddMediaCtlr_in( )" and insert -- AddMediaCtrl_in( ) --, therefor.

In column 13, line 35, delete "AddMediaCtlr_out( )" and insert -- AddMediaCtrl_out( ) --, therefor.

In column 13, line 64, delete "MediaCtl_out" and insert -- MediaCtrl_out --, therefor.

Signed and Sealed this
Ninth Day of August, 2011

David J. Kappos
*Director of the United States Patent and Trademark Office*